United States Patent
Kambara et al.

(10) Patent No.: US 7,127,484 B2
(45) Date of Patent: Oct. 24, 2006

(54) SERVER DECISION METHOD AND DEVICE THEREOF

(75) Inventors: Junichi Kambara, Kawasaki (JP); Ei Kanaoka, Kawasaki (JP); Fumio Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 10/117,399

(22) Filed: Apr. 5, 2002

(65) Prior Publication Data
US 2002/0116437 A1    Aug. 22, 2002

Related U.S. Application Data

(63) Continuation of application No. PCT/JP00/00511, filed on Jan. 31, 2000.

(51) Int. Cl.
*G06F 15/16* (2006.01)

(52) U.S. Cl. .................... 709/201; 709/226

(58) Field of Classification Search ............ 709/201, 709/221, 222, 223, 224, 226, 229, 230, 242
See application file for complete search history.

(56) References Cited

U.S. PATENT DOCUMENTS

| | | | | |
|---|---|---|---|---|
| 5,029,159 A | * | 7/1991 | Dolev | 370/216 |
| 5,365,523 A | * | 11/1994 | Derby et al. | 370/402 |
| 5,634,011 A | * | 5/1997 | Auerbach et al. | 709/242 |
| 5,862,348 A | * | 1/1999 | Pedersen | 709/229 |
| 5,938,732 A | * | 8/1999 | Lim et al. | 709/229 |
| 6,185,695 B1 | * | 2/2001 | Murphy et al. | 714/4 |
| 6,262,984 B1 | * | 7/2001 | Rochberger | 370/395.2 |
| 6,266,694 B1 | * | 7/2001 | Duguay et al. | 709/223 |
| 6,401,110 B1 | * | 6/2002 | Freitas et al. | 718/104 |
| 6,687,222 B1 | * | 2/2004 | Albert et al. | 370/230 |
| 6,748,429 B1 | * | 6/2004 | Talluri et al. | 709/221 |
| 6,748,438 B1 | * | 6/2004 | Palmer et al. | 709/229 |

FOREIGN PATENT DOCUMENTS

| | | |
|---|---|---|
| JP | 63104167 | 5/1988 |
| JP | 10171755 | 6/1998 |

OTHER PUBLICATIONS

Moy, J., "The OSPF Specification," Proteon, Inc., pp. 25-26, 35-37 Oct. 1989.

* cited by examiner

*Primary Examiner*—Bunjob Jaroenchonwanit
*Assistant Examiner*—Angela M. Widhalm
(74) *Attorney, Agent, or Firm*—Greer, Burns & Crain, Ltd.

(57) ABSTRACT

Each server of a cluster system is classified into a main server candidate server group capable of operating a specific task, a sub-server candidate server group capable of operating the specific task and a back up task, and an out of candidate server group which is excluded from operating the specific task and the back up task. Each server in the main candidate server group presents public relations information necessary for an election judgment of the main server to all servers and runs as a candidate at a boot time and, at the same time, compares this public relations information to that of other servers. When a server is determined to not be an adequate candidate, the server's presentation of public relations is stopped and the server's candidacy is withdrawn.

12 Claims, 16 Drawing Sheets

| RESOURCE IDENTIFICATION NUMBER(RID) | RESOURCE NUMBER (RN) | SPECIFICATION NUMBER (SID) | AVERAGE DUTY CYCLE (AVE) | MAXIMUM DUTY CYCLE (MAX) |
|---|---|---|---|---|
| 1 (CPU) | #1 | 10 (SPARC64GP,700MHz) | 60 | 70 |
| 2 (MEMORY) | #1 | 2 (6ns,512MB) | 70 | 85 |
| 3 (DISK) | #1 | 5 (10000rpm,20BG) | 60 | 65 |
| 3 (DISK) | #2 | 5 (10000rpm,20BG) | 70 | 70 |
| 4 (NET) | #1 | 7 (100Mbps) | 30 | 40 |
| 4 (NET) | #2 | 7 (100Mbps) | 50 | 80 |

| RESOURCE IDENTIFICATION NUMBER(RID) | REQUIRED VOLUME (RV) | THRESHOLD COEFFICIENT (TH) | WEIGHT COEFFICIENT (W) |
|---|---|---|---|
| 1 (CPU) | RV1 | TH1 | W1 |
| 2 (MEMORY) | RV2 | TH2 | W2 |
| 3 (DISK) | RV3 | TH3 | W3 |
| 4 (NET) | RV4 | TH4 | W4 |

SERVER DECISION METHOD AND DEVICE THEREOF

This is a continuation of International PCT Application No. PCT/JP00/00511 filed Jan. 31, 2000, which was not published in English.

TECHNICAL FIELD

The present invention relates to a server decision method and device thereof, which allot a main server performing management such as setting, operating, monitoring of cluster nodes and a sub-server performing the back-up thereof to a node group which constitutes a cluster system and, more in particular, to a node decision method and device thereof which decide the only main server and sub-server through election by the candidacy of each node from among the main server candidate node group and the sub-server candidate node group.

BACKGROUND ART

Heretofore in the past, a cluster system, which connects a plurality of servers and operates them as one system, has been used. Each server, which constitutes this cluster system, has been referred to as a node. The cluster system eliminates a node which develops a fault and hands over (transfer) the task which that node performed to another normal node so that the system is allowed to normally operate even though its scale is shrunk and the availability of the entire system is maintained. Further, the cluster system is such that each node has an independent OS, and the software for communication control and status notice among nodes, realization of consistency and monophyty among nodes and, moreover, cluster control for taking over another node task is arranged on the OS and a user application is performed on the OS. Since the cluster system is constituted by the nodes operated by the independent OS in this way, this necessitates a cluster management server which sets definition and operation of resources for each node and monitors a state of each node during the operation. This cluster management server realizes setting, operating and monitoring of the cluster system by a Web browser. The Web browser demands an applet which displays an management screen from the cluster management server which has a function of the Web server and instructs a request which was set and instructed on the applet to each node from the cluster management server. The Web browser can display and monitor a state of each node on the Web browser. For this reason, the cluster system allows any node among the node group to play a role of the cluster management server to perform setting, operating and monitoring of each node. Further, the cluster management server which performs setting, operating and monitoring of each node during the normal operation is taken as a main server and, by way of precaution against incapacitation of the main server to perform the operation due to some cause, the sub-server which takes over a part or the whole of the cluster management task is provided so that the reliability of the cluster system is improved.

By the way, the conventional main server which performs the cluster management task of each server and sub-server which performs a back-up operation thereof are fixedly decided to be the nodes which have a large allowance by taking into consideration a hardware constitution and allotment of applications at the time of the system constitution. However, when both of the main server and the sub-server were incapacitated to perform the operation due to faults and the like, there was a problem that a system manger was unable to use the Web browser and monitor the system and change the constitution, thereby causing interference with the operation of the entire system.

DISCLOSURE OF THE INVENTION

According to the present invention, a server decision method and device thereof are provided, wherein each node from among a node group which is a candidate independently decides the main server which operates specific tasks such as setting, monitoring and the like of the node and the sub-server which operates the back-up operation thereof so that the reliability of the system operation is improved.

The present invention is a node decision method of deciding the existence of the only server operating a specific task within the cluster system, which connects a plurality of nodes via a network. The node decision method of the present invention classifies each node of the cluster system into a main server candidate node group capable of operating the specific task, a sub-server candidate node group capable of operating the back-up operation of the specific task and an out of candidate node group excluded from the specific task and the back-up operation thereof. Next, each of the servers belonging to the main server candidate node group presents its public relations information necessary for the election judgment of the main server to all the nodes and runs as a candidate at a boot time and, at the same time, compares its public relations information to the public relations information of other nodes and, when it determines that it is not an adequate candidate, stops the presentation of its public relations information and withdraws its candidacy and allows the only main server approved by other servers within the main server candidate node group to exist. Further, each of the servers belonging to the sub-server candidate node group presents its public relations information necessary for the election judgment of the sub-server to all the nodes and runs as a candidate at a boot time and, at the same time, compares its public relations information to the public relations information of other nodes and, when it determines that it is not an adequate candidate, stops the presentation of its public relations information and withdraws its candidacy and allows the only sub-server approved by other servers within the sub-server candidate node group to exist. In the situation where the main server or the sub-server does not exist in this way at the boot time of the system, the main server candidate node group and the sub-server candidate node group can elect the main server or the sub-server by judging respective states and, as far as there exist the nodes which run for the candidate, even when the main server or the sub-server stops due to the fault and the like, can elect a new main server or sub-server and take over the specific task so as to improve the availability of the system.

At the operation starting time after the rising, the main server or the sub-server periodically reports the operation of the specific task to other nodes and asserts its right of the main server or the sub-server and, when a report which asserts the same right of the main server or the sub-server was received from other nodes, recognizes the existence of a plurality of main servers or the duplicate starting of a plurality of sub-servers and compares its public relations information to the public relations information of other nodes which run for the candidate and, when it determines that it is not an adequate candidate, stops the presentation of its public relations information and withdraws its candidacy, thereby allowing the only main server or sub-server approved by other servers within the main server or sub-server candidate node group to exist. In this way, by monitoring a notice to the effect that a periodic right is asserted, the main server or the sub-server recognizes abnormality of the main server or the sub-server being duplicate-started at the operation starting time after the rising and takes a plurality of main servers or sub-servers existing at the same time as a new candidate node group, so that exclusiveness of the main server or the sub-server can be assured similarly to the boot time of the nodes.

Further, during the operation, the main server or the sub-server periodically reports the operation of the specific task to other nodes and asserts its right of the main server or the sub-server and, when a report which asserts the same right of the main server or the sub-server was received from other nodes, recognizes the existence of a plurality of main servers or a plurality of sub servers and presents its public relations information to all other nodes and runs for the candidate and compares its public relations information to the public relations information from other nodes and, when it determines that other nodes are adequate for the main server or the sub-server, stops the specific task at an adequate time and hands over its right of the main server or the sub-server to other servers. For this reason, even if the operational situation fluctuates, when that fluctuation is for a constant period and stable, the node, which meets that situation, can perform the operation as a new server or sub-server.

Here, the main server candidate node group is a node group which has resources necessary to operate the specific task or which positively desires to operate the specific task, and the sub-server candidate node group is a node group which does not have enough resources to operate the specific task or which passively desires to operate the specific task and, moreover, the out of the candidate node group is a node group which does not have resources necessary to operate the specific task or which does not desire to operate the above described specific task. Further, the determination that the candidate is adequate or not adequate for the main server or the sub-server is obtained as an allowable rate of distributable resources from a duty cycle of required resources and public relations information of the specific task when the public information is the duty cycle of resources and, when the election probability of the candidate is smaller than the election probability of other nodes, the candidate stops the presentation of its public relations information and withdraws its candidacy. In this case, the allowable rate is obtained for every classification of resources such as CPU, memory, disck and the like, and the smallest allowable rate among them is taken as an election probability. The specific task of the main server of the present invention is a cluster management task, which performs setting, operating and monitoring of each node, and the specific task of the sub-server is a task, which performs the back-up operation of the cluster management task of the main server.

On the other hand, the present invention provides a node decision device, which decides the existence of the only server which performs a certain specific task. The server decision device of the present invention classifies each node of the cluster system into the main server candidate node group which allots the operation of the specific task, the sub-server candidate node group which allots the back-up task of the specific task and the out of the candidate node group which was excluded from the operation of the specific task and the back-up operation thereof, and a main server candidacy processing unit is provided for each node belonging to the main server candidate node group, and a sub-server candidacy processing unit is provided for each node belonging to the sub-server candidate node group.

The main server candidacy processing unit has each of the nodes belonging to the main server candidate node group present its public relations information necessary for the election judgment of the main server to all the other nodes and run for the candidate at a boot time and, at the same time, it compares its public relations information to the public relations information of other nodes and, when it determines that it is not an adequate candidate, stops the presentation of its public relations information and withdraws its candidacy and allows the only main server approved by other nodes within the main server candidate node group to exist. The sub-server candidacy processing unit has each of the nodes belonging to the sub-server candidate node group present its public relations information necessary for the election judgment of the sub-main server to all other nodes and runs for the candidate at a boot time and, at the same time, it compares its public relations information to the public relations information of other nodes and, when it determines that it is not an adequate candidate, stops the presentation of its public relations information and withdraws its candidacy and allows the only sub-sever approved by other nodes within the sub-server candidate node group to exist. The detail of the server decision device is basically the same as the server decision method.

Further, the present invention is characterized in that a server candidacy processing unit is provided, wherein the node decision method of deciding the existence of the only server which operates a certain specific task within a plurality of nodes connected via a network classifies a plurality of nodes into the server candidate node group capable of operating the specific task and the out of candidate node group which was excluded from the operation of the specific task, and each of a plurality of nodes presents its public relations information necessary for the election judgment of a specific task server to all other nodes and runs for the candidate and, at the same time, compares its public relations information to the public relations information of other nodes and, when it determines that it is not an adequate candidate, stops the presentation of its public relations information and withdraws its candidacy and allows the only specific task server approved by other nodes within the node group to exist.

BRIEF DESCRIPTION OF DRAWINGS

FIG. 6 is an explanatory view of public relations information notified to other nodes by the server candidacy processing unit of FIG. 5.

BEST MODE FOR CARRYING OUT THE INVENTION

Figure 1A:
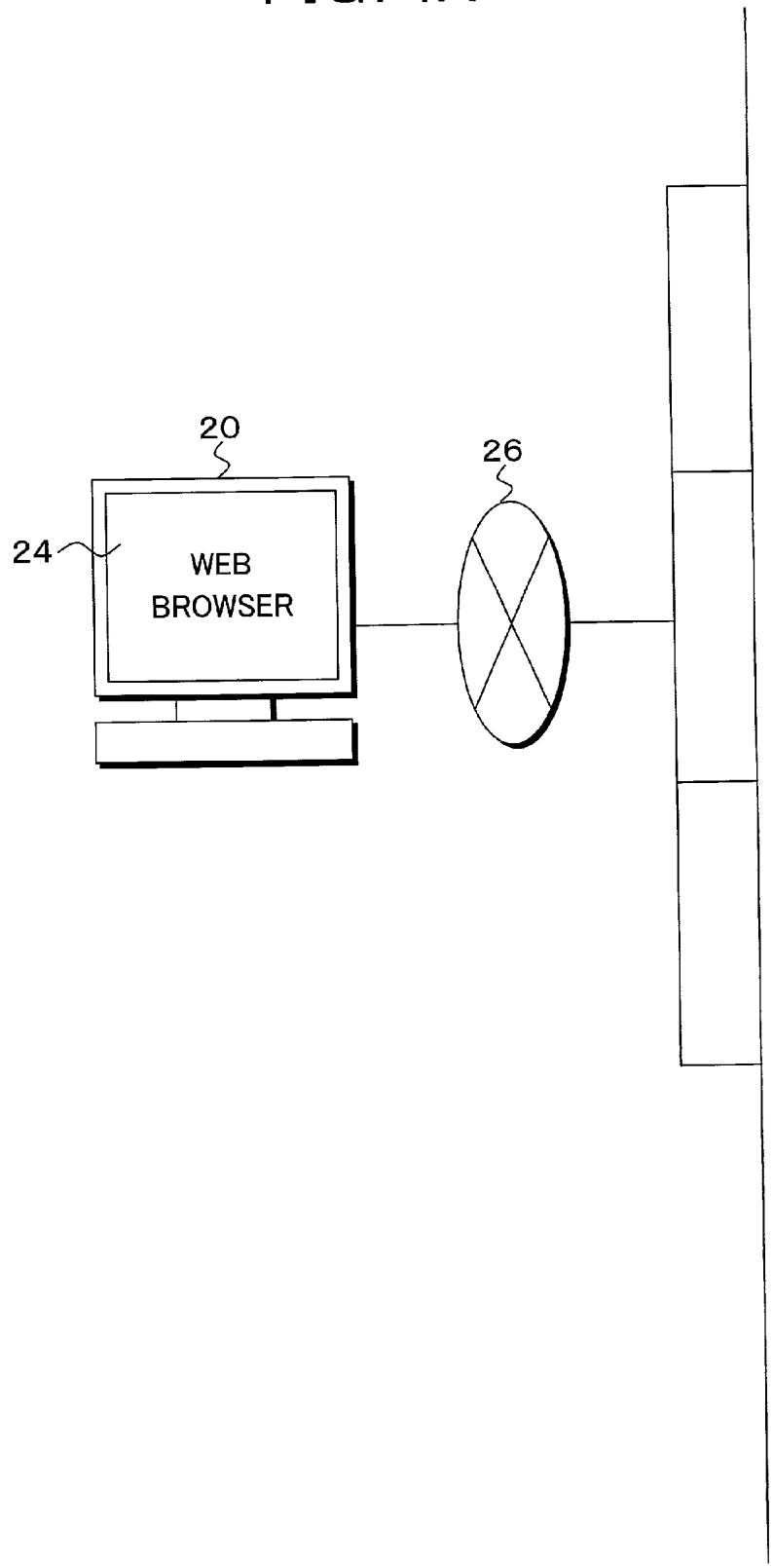
FIG. 1A and FIG. 1B are block diagrams of a two-layer constitutional cluster system to which the present invention is adapted.
Figure 1B:
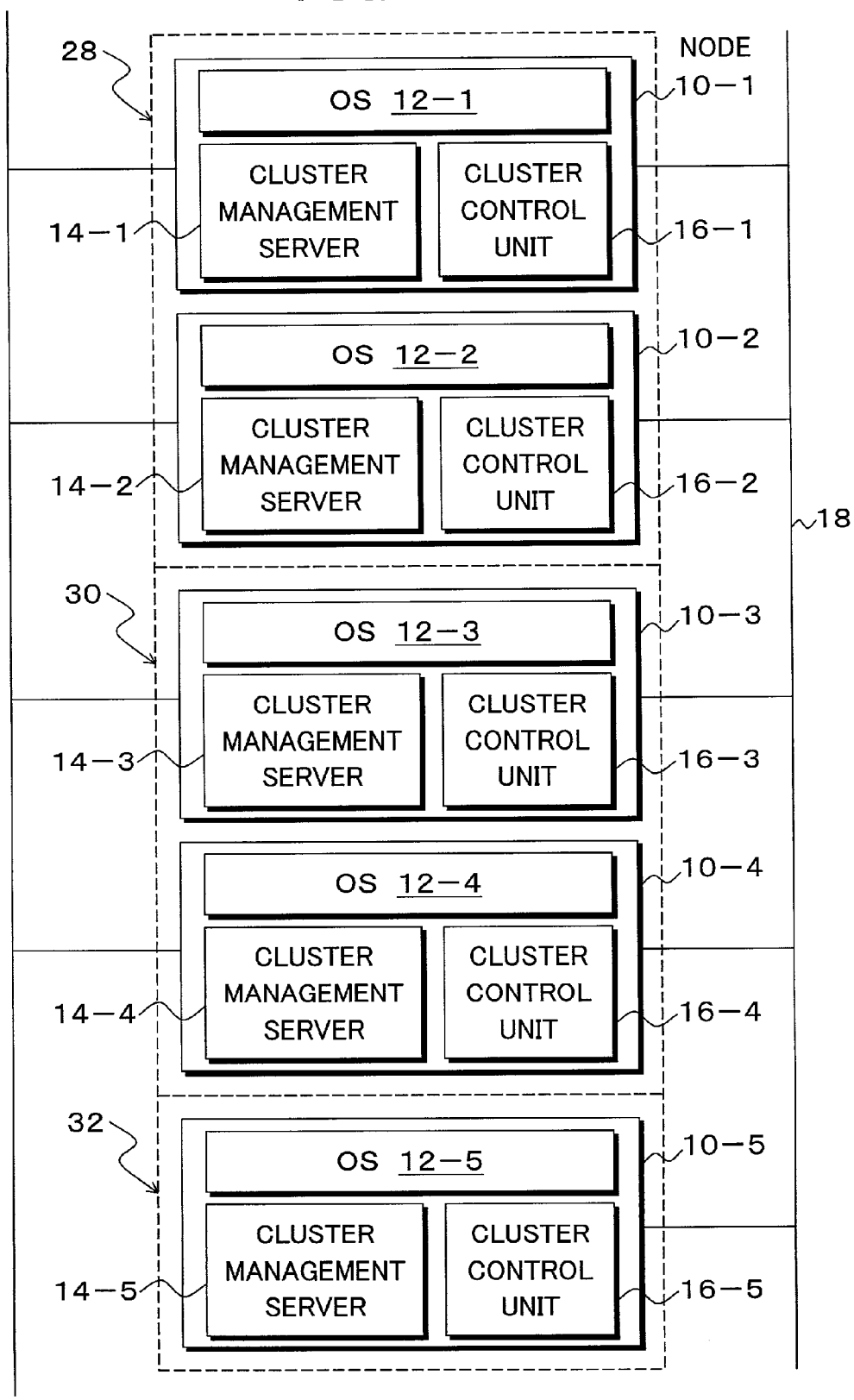

FIG. 1A and FIG. 1B are views a two-layer constitutional cluster system to which a server decision method and device thereof of the present invention are adapted. The cluster system is, for example, constituted by nodes 10-1, 10-2, 10-3, 10-4, 10-5 and connected through a LAN 18. Note that actually it is constituted by such as 32 nodes, 64 nodes, 128 nodes, 256 nodes, 512 nodes. Each of the nodes 10-1 to 10-5 is provided with OS 12-1 to 12-5, cluster management servers 14-1 to 14-5 and cluster control units 16-1 to 16-5. As for the OS 12-1 to 12-5, for example, Solaris is used. The two-layer constitution of the cluster system of FIG. 1A and FIG. 1B have a form, wherein the cluster nodes realized by the cluster management servers 14-1 to 14-5 and the cluster control units 16-1 to 16-5 exist in the respective same nodes of the nodes 10-1 to 10-5. Each of the cluster management servers 14-1 to 14-5 provided in the nodes 10-1 to 10-5 can perform setting, operating and managing of a Web browser 24 of a client 20 connected via a network 26 such as the Internet, the Intranet and the like. That is, the Web browser 24 of the client 20 demands a Java applet which displays a setting and operational screen necessary for the cluster management from the cluster management servers 14-1 to 14-5 and performs a processing to instruct a request which is set and instructed on this applet to the cluster control units 16-1 to 16-5 from the cluster management servers 14-1 to 14-5. Further, the cluster management servers 14-1 to 14-5 deliver a cluster setting screen and a cluster operational screen requested by a HTTP protocol on the Web server to the Web browser 24 and, at the same time, according to the set up content, issues a command to the cluster nodes realized by the cluster control units 16-1 to 16-5 and notifies the Web browser 24 of the result. In such a cluster system, any one of the cluster management servers 14-1 to 14-5 provided in the nodes 10-1 to 10-5 is decided as the main server, and the main server performs setting and operating of the nodes 10-1 to 10-5. For the termination of the node having the cluster management server which is decided as the main server, a stand-by sub-server which takes over the function of the cluster management server for the back-up purpose is decided except for the main server. At the boot time of the cluster system, the server decision processing of the present invention performs the decision of the only main server and sub-server according to the candidacy processing with the cluster management servers 14-1 to 14-5 of the nodes 10-1 to 10-5 as an object. For this reason, the present invention divides the nodes 10-1 to 10-5 into the groups of the main server candidate node group 28, the sub-server candidate node group 30 and the out of candidate node group 32. The main server candidate node group 28 is a node group capable of operating the management task by the cluster management server. In general, the main server candidate node group 28 can be said as a node group which has assets necessary for operating a certain specific task or which positively desires to operate the specific task. The sub-server candidate node group 30 is a stand-by system node group capable of operating the back-up task of the cluster management task. In general, the sub-server candidate node group 30 can be said as a node group which does not have enough assets for operating the specific task of the main server or which passively desires to operate the specific task. Further, the out of candidate node group 32 is a node group which was excluded from the operation of the cluster management task and the back-up task thereof and, in general, can be said as a node group to which the operation of the specific task of the main server is not preferably entrusted. In the cluster system of FIG. 1A AND FIG. 1B, the nodes 10-1 to 10-4 are connected to the Web browser 24 of the client 20 vi the network 24, and the node 10-5 is not connected. Therefore, the node 10-5 which cannot perform the operational management by the Web browser 24 belongs to the out of candidate node group 32. In contrast to this, the nodes 10-1 to 10-4 which can perform the operational management from the Web browser 24 is an object of the main server candidate node group 28 and the sub-server candidate node group 30 and, in the present embodiment, two of the nodes 10-1, 10-2 are allotted to the main server candidate node group 28, and the nodes 10-3, 10-4 are allotted to the sub-server candidate node group 30. Such allotment of the nodes between the main server candidate node group 28 and the sub-server candidate node group 30 makes the nodes included in the main server candidate node group smaller 28 in the load of the cluster control unit and therefore can be said as the nodes having a larger processing allowance even when the cluster management server is provided.

Such allotment of the nodes between the main server candidate node group 28 and the sub-server candidate node group 30 is predetermined at an initial setting of the boot time. The two layer constitutional cluster system is applied to a relatively small scale system and takes the constitution which does not provide the node of a specific cluster management server.

Figure 2A:
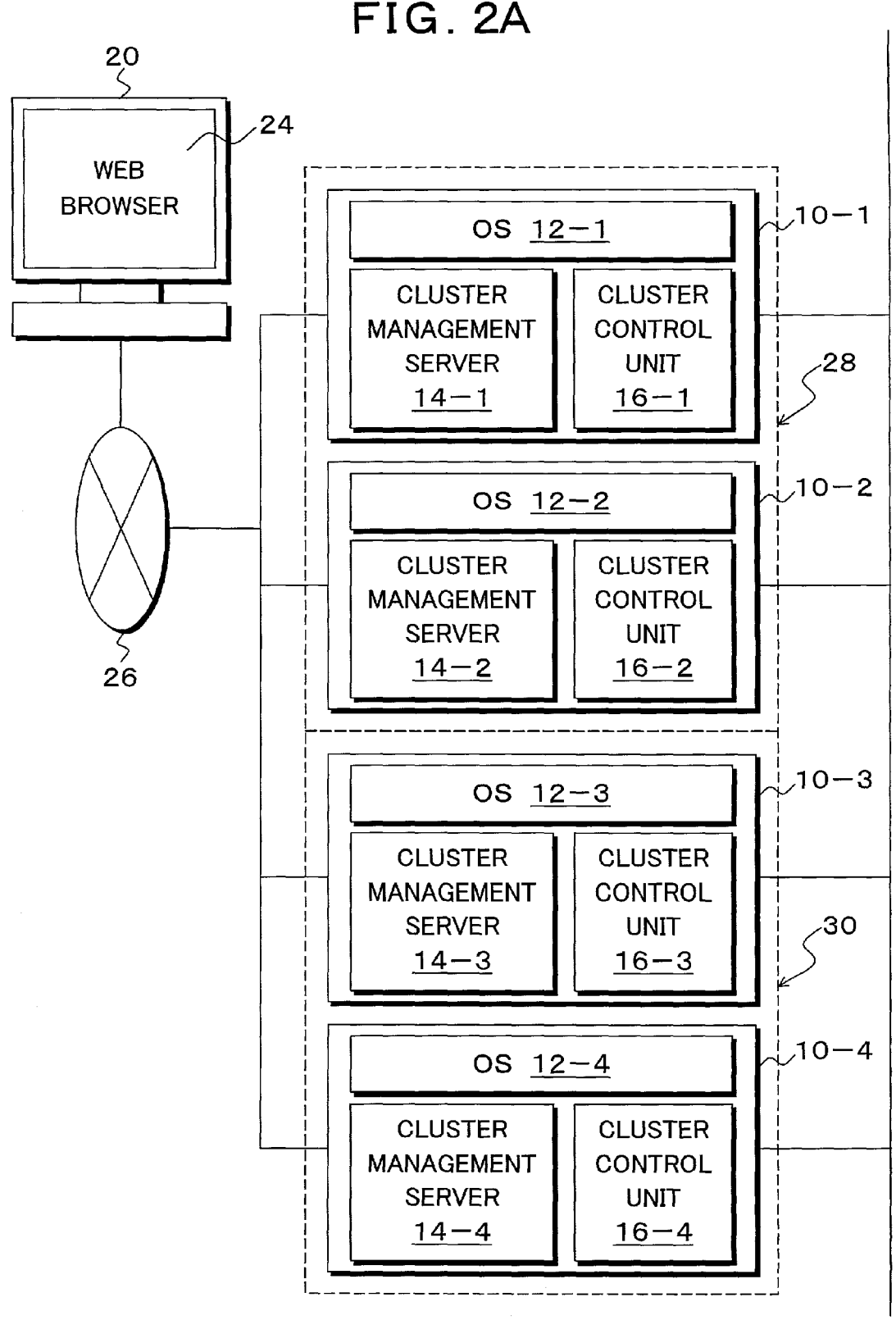
FIG. 2A and FIG. 2B are block diagrams of a three-layer constitutional cluster system to which the present invention is adapted.
Figure 2B:
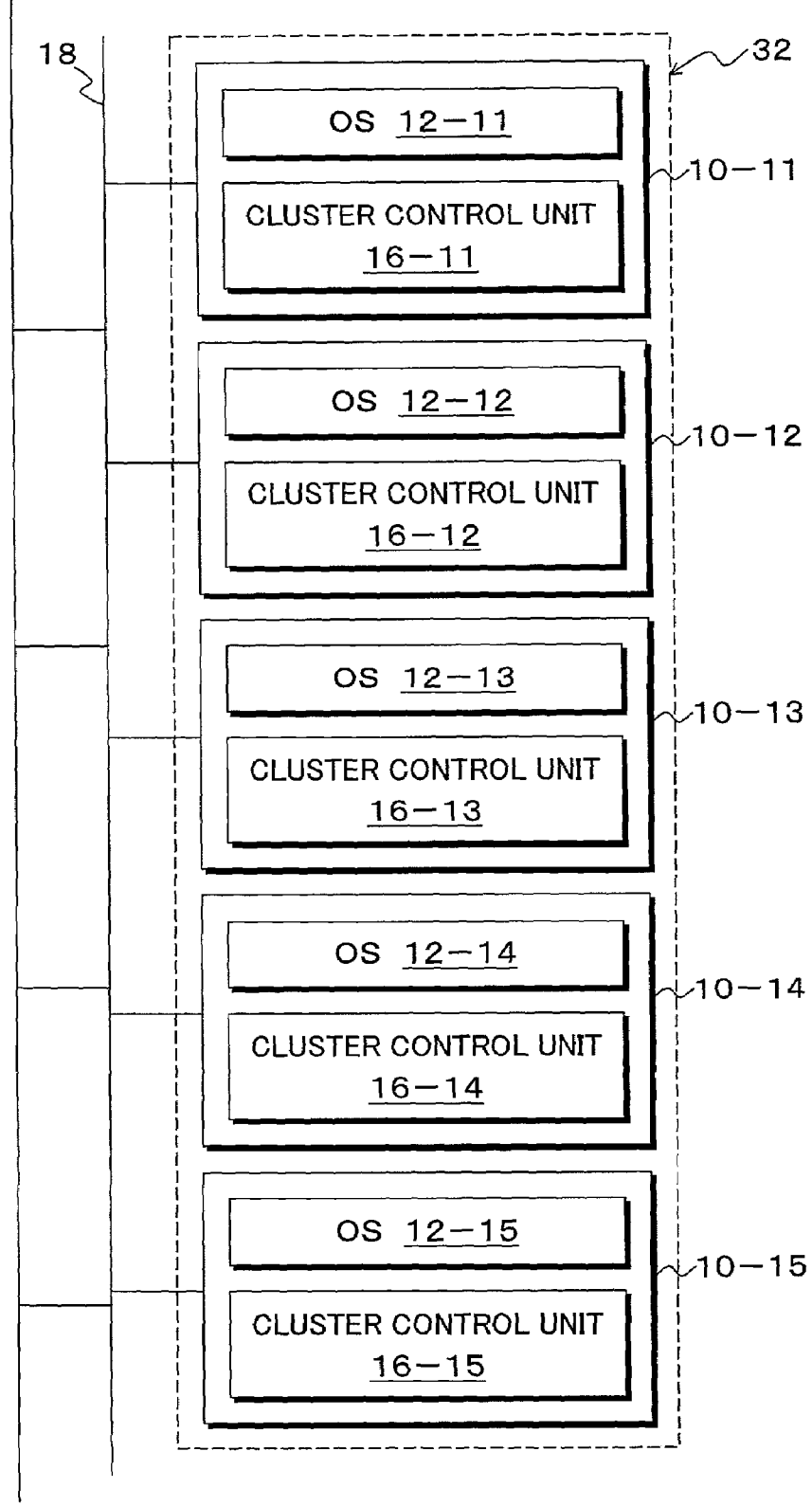

FIG. 2A and FIG. 2B are block diagrams of a three-layer constitutional cluster system to which the server decision processing of the present invention is adapted. The three-layer constitutional cluster system takes a form, wherein the cluster management server and the cluster node are different node. The form of the three-layer constitution is a constitution where the cluster is centrally managed or the cluster node is not entrusted with a load as the cluster management server. The cluster system is constituted by the nodes 10-1 to 10-4 comprising both of the cluster management server and the cluster control unit and the nodes 10-11 to 10-15 which do not have the cluster management server, and these nodes 10-1 to 10-4, 10-11 to 10-15 are connected via a LAN. The nodes 10-1 to 10-4, 10-11 to 10-15 comprise OS 12-1 to 12-4, 12-11 to 12-15 and the cluster control units 16-1 to 16-4, 16-11 to 16-15 which function as the cluster node. Further, the nodes 10-1 to 10-4 are provided with the cluster management servers 14-1 to 14-4. In such cluster system of the three-layer constitution, since the nodes 10-1 to 10-4 are connected to the Web browser 24 of the client 20 via the network 26 and can remotely perform the cluster management, they become the objects of the main server candidate node group 28 and the sub-server candidate node group 30. In this example, the nodes 10-1 to 10-2 are classified into the main server candidate node group 28, and the nodes 10-3 to 10-4 are classified into the sub-server candidate node group 30. Further, the nodes 10-11 to 10-15 are classified into the out of candidate node group 32.

Figure 3:
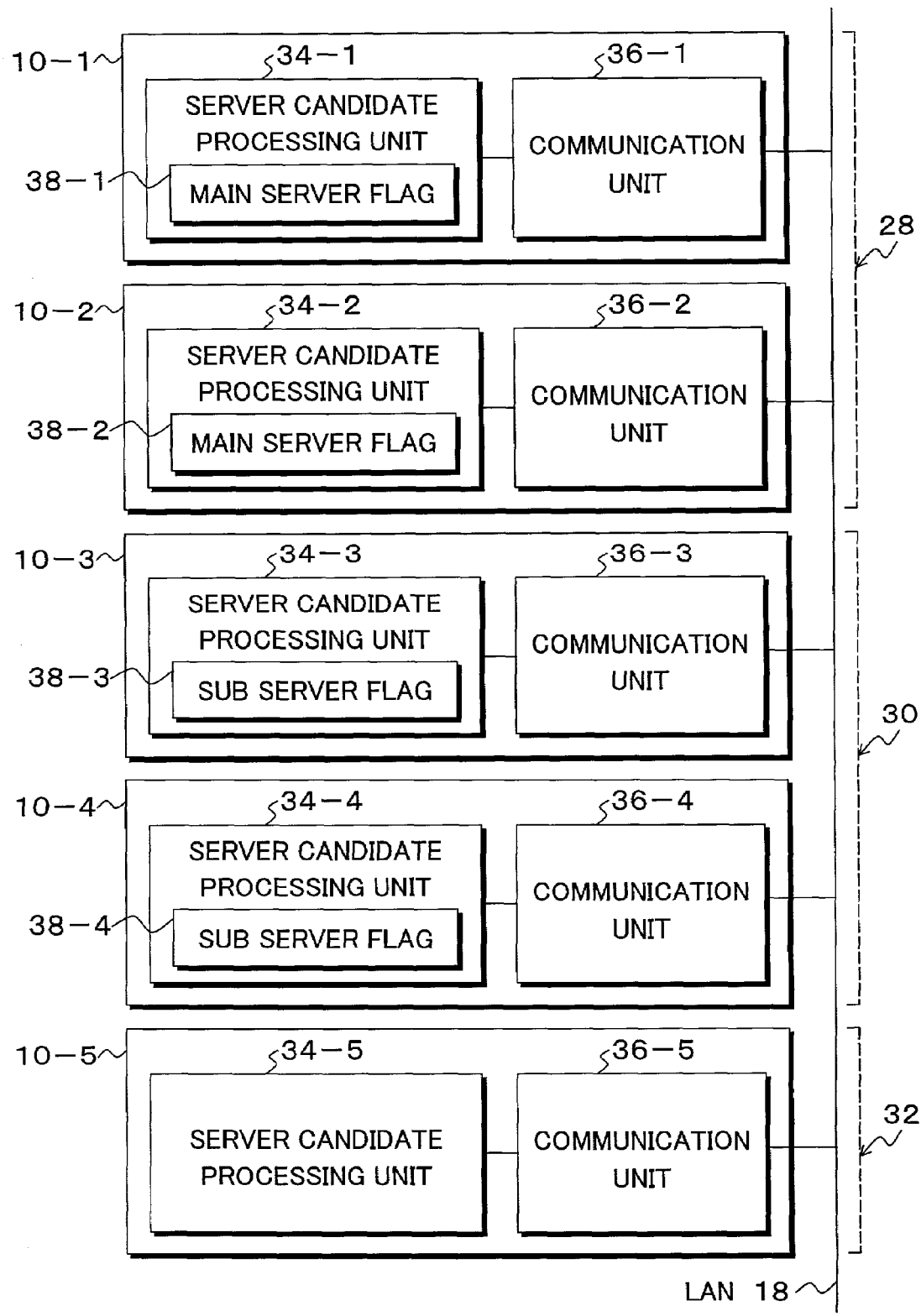
FIG. 3 is a server decision functional block according to the present invention, which divides a main server candidate node group and a sub-server candidate node group.

FIG. 3 shows a constitution of the function for the server decision by the present invention, which is provided in the nodes 10-1 to 10-5 of the cluster management servers 14-1 to 14-5. In FIG. 3, the nodes 10-1 to 10-5 are provided with server candidacy processing units 34-1 to 34-5 and communication units 36-1 to 36-5. Further, the server candidacy processing units 34-1 to 34-2 of the servers 10-1, 10-2 which belong to the main server candidate node group 28 are provided with the main server flags 38-1, 38-2 which are set when decided as the main server. Further, the server candidacy processing units 34-3, 34-4 of the servers 10-3, 10-4 which belong to the sub-server candidate node group 30 are also provided with the sub-server flags 38-3, 38-4 which are turned ON when decided as the sub-server. In contrast to this, the server candidacy processing unit 34-5 of the node 10-5 which belongs to the out of candidate server node group 32 is not provided with the server flag since it is not the object of the server decision.

Figure 4:
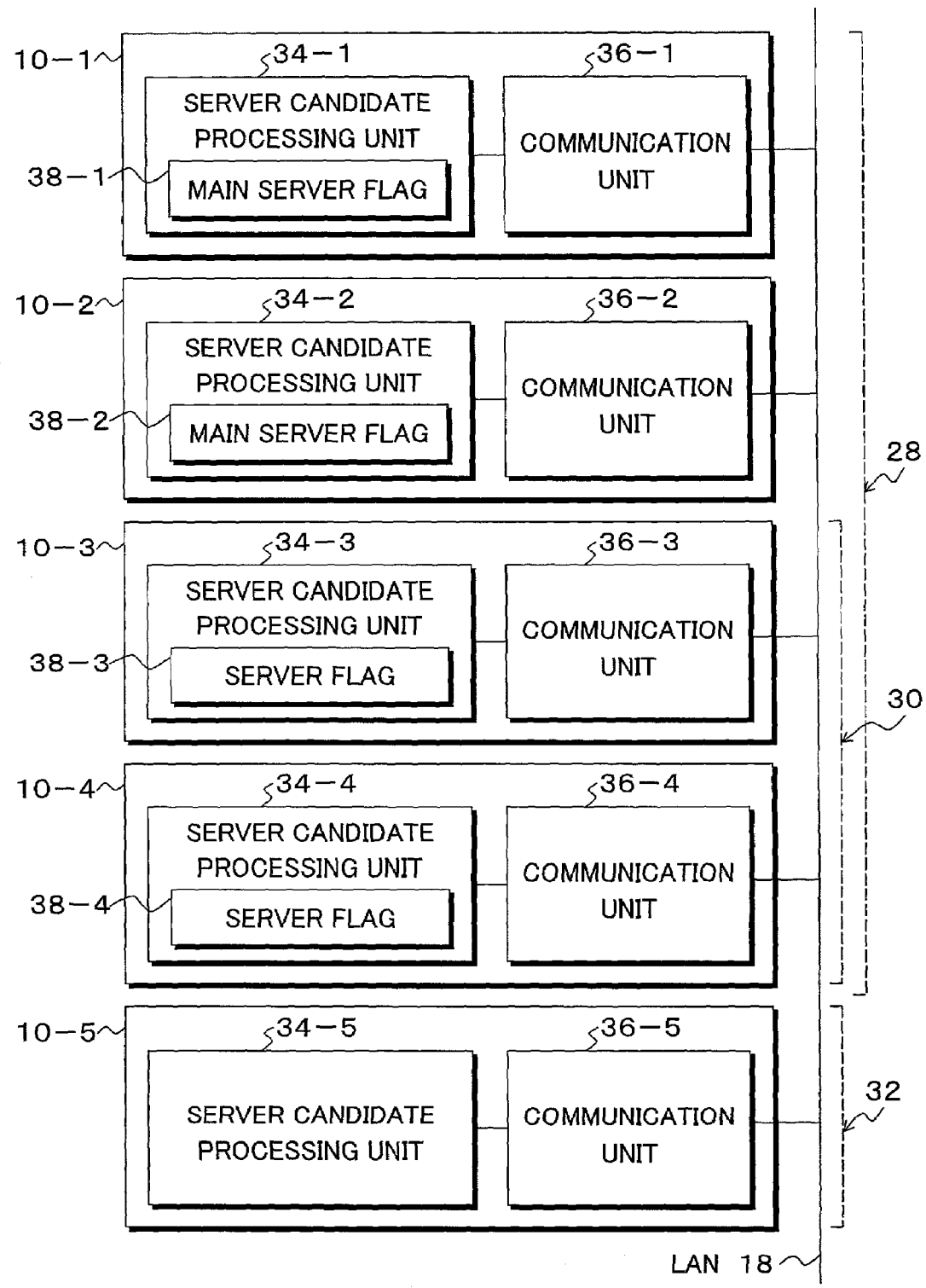
FIG. 4 is a server decision functional block according to the present invention, which divides a main server candidate node group and a sub-server candidate node group.

FIG. 4 shows another embodiment of a group classification of the main server candidate node group and the sub-server candidate node group in the cluster system of the two-layer constitution of FIG. 1A AND FIG. 1B. The group classification of the main server candidate node group 28 and the sub-server candidate node group 30 of FIG. 3 classifies the nodes 10-1 to 10-4 which are accessible from the Web browser into two groups each, while the embodiment of FIG. 4 classifies four nodes of the nodes 10-1 to 10-4 into the main server candidate node group 28 and, among these four nodes, the decision of the main server is performed by a candidacy system. Further, with respect to the sub-server candidate node group 30, similarly to the case of FIG. 3, the decision of the sub-server is performed between the nodes 10-3 and 10-4 by the candidacy system.

Figure 5:
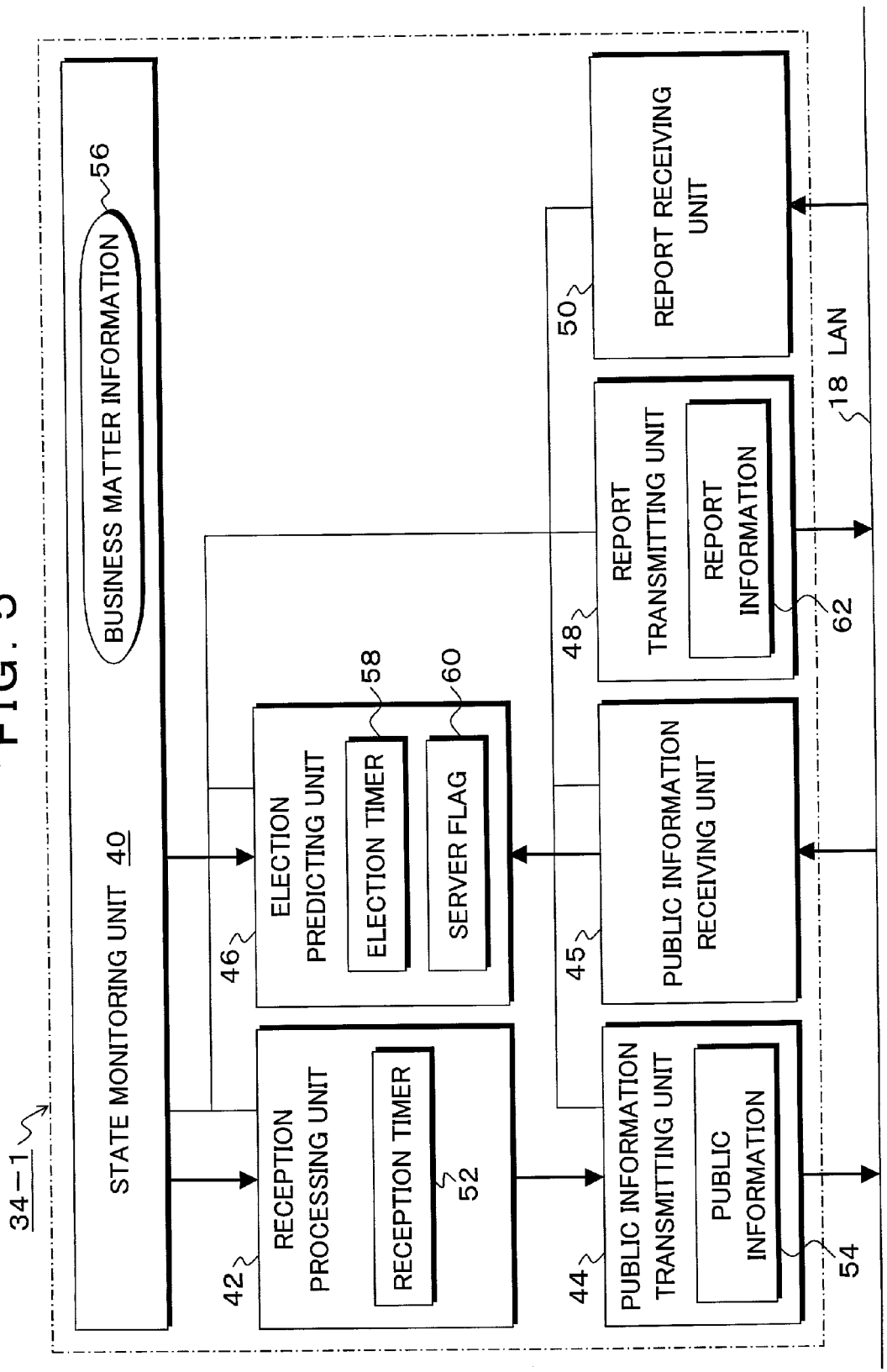
FIG. 5 is a functional block diagram of a server candidacy processing unit which performs a server decision of the present invention.

FIG. 5 is a functional block diagram of the server candidacy processing unit 34-1 of the node 10-1 shown in FIGS. 3 and 4. This constitution is the same as those of other server candidacy processing units 34-2 to 34-5. In FIG. 5, the server candidacy processing unit 34-1 is constituted by a state monitoring unit 40, a reception processing unit 42, a public information transmitting unit 44, a public information receiving unit 45, an election predicting unit 46, a report transmitting unit 48 and a report receiving unit 50. At a boot time by power on the system, the state-monitoring unit 40 starts the server candidacy processing to decide the main server and performs the entire control of the main server decision. The server candidacy processing by the state-monitoring unit 40 is performed by the following three phases:
(1) At boot time by the node
(2) At the operation starting time after boot up the system
(3) During the operation Among which, the server execution processing at the boot time by the node is a basic processing, and the remaining processing after the boot up the system and the processing during the operation are the processing for resolving an abnormal state in which there exist not less than two main servers in the cluster system. The state-monitoring unit 40 instructs the reception processing unit 42 to start the reception processing when the initial processing is completed by the node rising. The reception processing unit 42 is provided with a reception timer 52 and performs a predetermined time management from the start of the reception to the end thereof. That is, the reception processing unit 42 starts the reception in a state of other nodes being decided as the main server or the sub-server during the operation and, when the report information which asserts the right of being the main server or the sub-server from other nodes during the reception period is received, triggers the reception timer 52 and repeats the reception processing. In contrast to this, when the report information which asserts the right of being the main server or the sub-server from other nodes during the reception period is not received, the reception processing unit 42 determines that the main server or the sub-server is not in a state of being decided and allows the process to advance to the candidacy processing to decide the main server or the sub-server after the reception period is completed. The advancement to the candidacy processing to decide the main server or the sub-server after the reception period is completed is made at the system starting time which arouses each node. The public information transmitting unit 44 transmits its public relations information 54 necessary for judging the election of the main server to all the other nodes via the LAN 18 on the basis of the completion of the reception period (election start judgment) by the reception timer 52 of the reception processing unit 42. This public information 54 has, for example, the information content of FIG. 6.

The public relations information 54 of FIG. 6 shows a usage state of resources of the nodes. The public relations information 54 includes a resource identification number (RID), a resource number (RN), a specification number (SID), an average duty cycle (AVE) and a maximum duty cycle (MAX). As for the resource identification number (RID), the public relations information 54 has No.1 to No.4, and No.1 denotes a CPU, No.2 a memory, No.3 a disk and No.4 a network. The resource number (RN) shows the number of resources for the same resource identification number. Within these numbers, the resource Nos.1 and 2 are shown the resource number #1 since a CPU and a memory is one each. As for the disk and the network of the resource identification numbers 3, 4, since they have two each of them, the resource numbers are #1, #2. The next specification number (SID) shows the name and the performance of the resources being used, and can be obtained by looking at the information of the usage table corresponding to the specification number (SID). The next average duty cycle (AVE) and the maximum duty cycle (MAX) are shown in percentage and provided as statistic data.

Referring back to FIG. 5, the presentation of the public relations information from the public information transmitting unit 44 to other nodes means a candidacy for the election to decide the main server. That is, the server candidacy processing unit 34-1 transmits the public relations information 54 from the public information transmitting unit 44 as an announcement of the candidacy for the election to decide the main server. The public information receiving unit 45 receives the public relations information 54 presented as the candidacy from other nodes from the LAN 18 and presents it to the election predicting unit 46. The election predicting unit 46 is provided with an election timer 58 and a server flag 60. The election timer 58 starts on the basis of a reception completion by the reception timer 52 of the reception processing unit 46 and sets a constant election period. The election predicting unit 46 performs an election prediction by using the public relations information 54 of the candidate transmitted from the public information transmitting unit 44, the public relations information by the candidacy of other nodes received by the public information receiving unit 54, a task requirement information 56 necessary for the processing of the cluster management server provided by the state monitoring unit 40. This election prediction compares the public relations information 54 of the candidate to the public information of other nodes which runs for the candidate and, when it determines that it is not adequate candidate, stops the presentation of its public relations information and withdraws its candidacy. By withdrawing the candidacy in this way when it determines that it is not an adequate candidate by comparison with the other node, there remains, as a result, the only server candidate within a plurality of nodes at the completion time of the election period, and the candidate which remained to the last is elected as the main server. Here, the processing by the election predicting unit 46 calculates an election probability from the public relations information of the candidate and the public relations information of other nodes, respectively and, when (election probability of the candidate)<(election probability of the other node), the candidacy is cancelled. This election probability is given by the following formula:

$$\text{election probability} = \text{MIN(allowable rate)}. \tag{1}$$

Here, the allowable rate is calculated for each resource number 1 to 4 in the public relations information 54 shown in FIG. 6, that is, for each type of the resources, among which the smallest allowable rate is taken as the election probability. The allowable rate which shows this election probability is calculated by the following formula:

$$\text{Allowable rate} = (\text{resource volume } V/\text{requirement volume } RV) \times \text{weight coefficient } W \times 100\% \tag{2}$$

The resource volume V, the requirement volume RV, the weight coefficient W in the formula (2) are calculated from the task requirement information 56 by the state monitoring unit 40, that is, from the task requirement information 56 necessary for the operation of the cluster management server.

Figure 7:
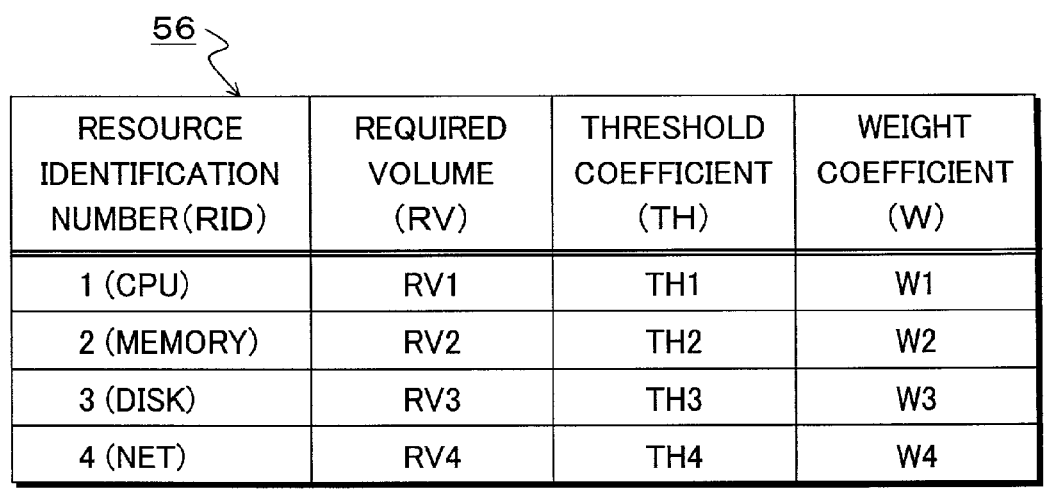
FIG. 7 is an explanatory view of operational requirement information of a cluster management task used for election prediction.

FIG. 7 is one example of the task requirement information 56. This task requirement information 56 corresponds to the resource identification numbers 1 to 4 and defines the resource requirement volume RV, a threshold value coefficient TH and the weight coefficient W. Here, the resource volume of the formula (2) is calculated by the following formula.

$$\text{Resource volume } V = (100\text{-duty cycle } U) \times \text{performance coefficient PF} \tag{3}$$

Here, the duty cycle U of the formula (3) is given by the following formula:

$$\text{Duty cycle } U = \text{Average duty cycle AVE} + \text{Maximum duty cycle MAX} \times \text{threshold coefficient TH} \tag{4}$$

The average duty cycle and the maximum duty cycle of the formula (4) are obtained from the public relations information 54, and the threshold coefficient TI is obtained from the task requirement information 56 of FIG. 7. Further, the performance coefficient PF of the formula (3) can be obtained by referring to a performance table prepared in advance by the specification number SID of the resources.

$$\text{Performance coefficient PF} = \text{Performance Table (specification number SID)}. \tag{5}$$

Accordingly, the election predicting unit 46 calculates the allowable rate according to the formulas (2) to (5) for each resource identification number of the public relations information of the candidate and selects the smallest allowable rate according to the formula (1) from within the allowable rates obtained for every type of the resources and takes it as the election probability. Finally, the candidate compares its election probability to the election probability of the other node and, when the election probability of the candidate is smaller, it stops the transmission of the public relations information 54 and withdraws its candidacy. In order to withdraw the candidacy, the server flag 60 provided in the election predicting unit 46 is turned OFF. In contrast to this, when the election probability of the candidate is larger than the election probability of the other node, the candidacy is not withdrawn, but the completion of the election period is waited, while the server flag is ON. Needless to mention, the judgment of the election prediction by comparison to the other node during the election period is performed among a plurality of nodes. When the election period is completed by the election timer 58 and the server flag 60 is still on without the candidacy being withdrawn, this fact decides the candidate as the main server. When the candidate is decided as the main server, the report information to assert that it is the main server is periodically transmitted from the reporting transmitting unit 48 to all other nodes during the operation after the election period is completed. In this way, the other node which was not decided as the main server can always recognize that the node which transmitted the report information 62 is the main server. The report receiving unit 50 receives the report information from the other node showing that it is the main server and notifies the state monitoring unit 40 of that information. In the case where the report information 62 is periodically transmitted to other nodes from the report transmitting unit 48, when the report receiving unit 50 receives the report information from the other node to insist that it is the main node, the state monitoring unit 40 recognizes that there is an abnormality of two main servers existing in the cluster system. When the abnormality of not less than two main servers existing in the cluster system is recognized in this way, in order to resolve this abnormality, the state monitoring unit 40 instructs the reception processing unit 42 to start the reception processing and perform again the server candidacy processing to decide the main server. Note that, when a part of the network which transmits the report information fails (failure of some switching hub), the node group is divided into two and the main server is decided in each divided node group, and when the failure of the network is reinstated so that one node group is restored, this abnormality of not less than two main severs existing within the same system develops. For example, when two switching hubs SH1 and SH2 are provided as a network via a switching hub SH3 and a plurality of nodes are connected to the switching hub SH1 and also a plurality of other nodes are connected to the switching hub SH2, when the switching hub SH3 fails, the transmission between the switching hubs SH1 and SH2 is incapacitated and the nodes are separated into two node groups connected to each hub. For this reason, the main server is decided in each of the separated two node groups. After that, when the failure of the switching hub SH3 is reinstated and the transmission between the switch hubs SH1 and SH2 is made possible, an abnormal state develops, wherein two main servers exist in the node group which was restored to one group. Followed by such a failure of the part of the network, when a state develops in which two main servers exist within the system, the two nodes which became the main servers receive the report information from the other node which insists that it is the main server and recognize the abnormality of a plurality of main servers being existing and regard the report information from the other node as the candidate and start the server candidacy processing by the start of the reception processing unit 42 similarly to the boot time.

Figure 8A:
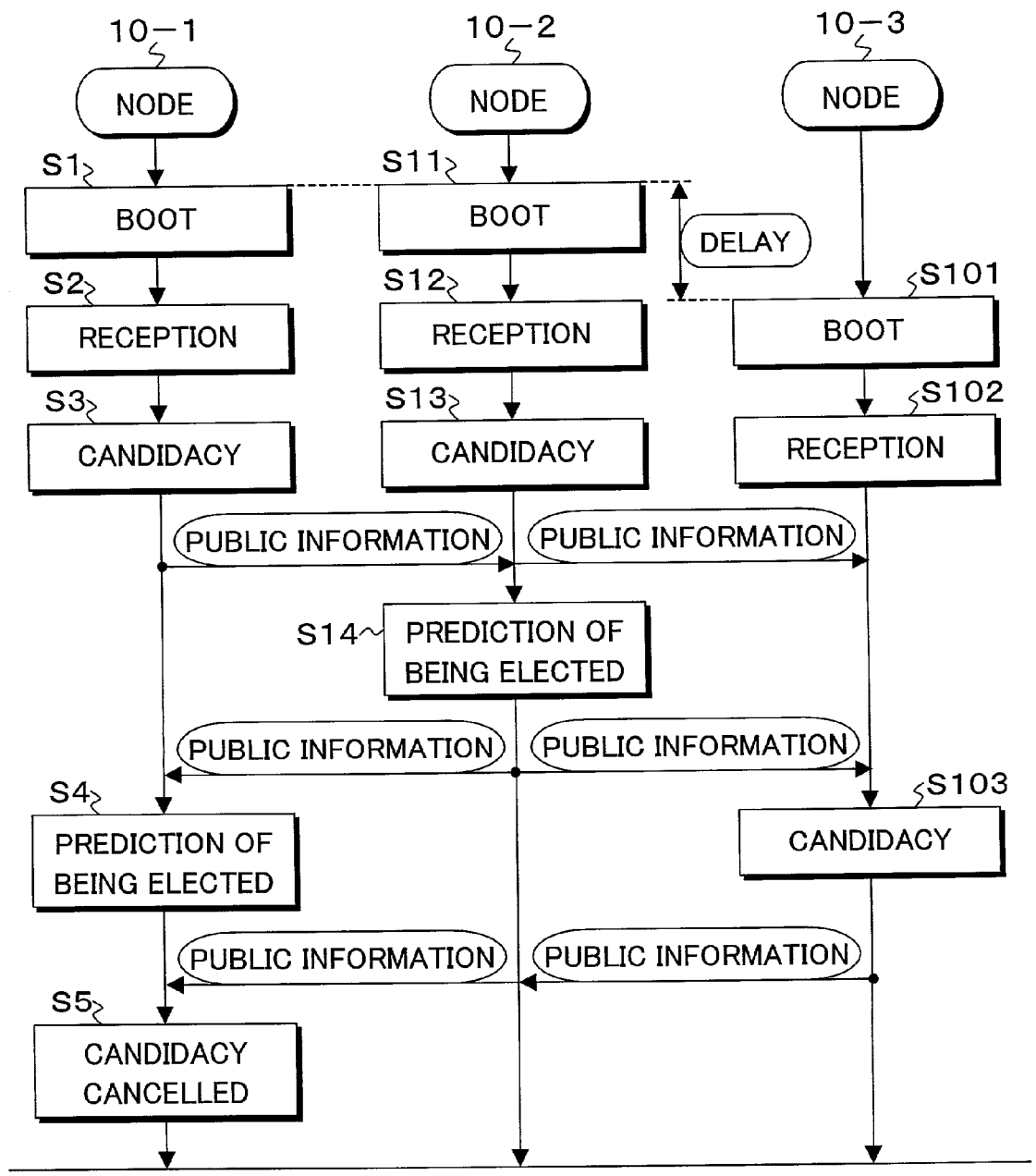
FIG. 8A and FIG. 8B are time charts of a server decision processing at a boot time, which takes three nodes as an example.
Figure 8B:
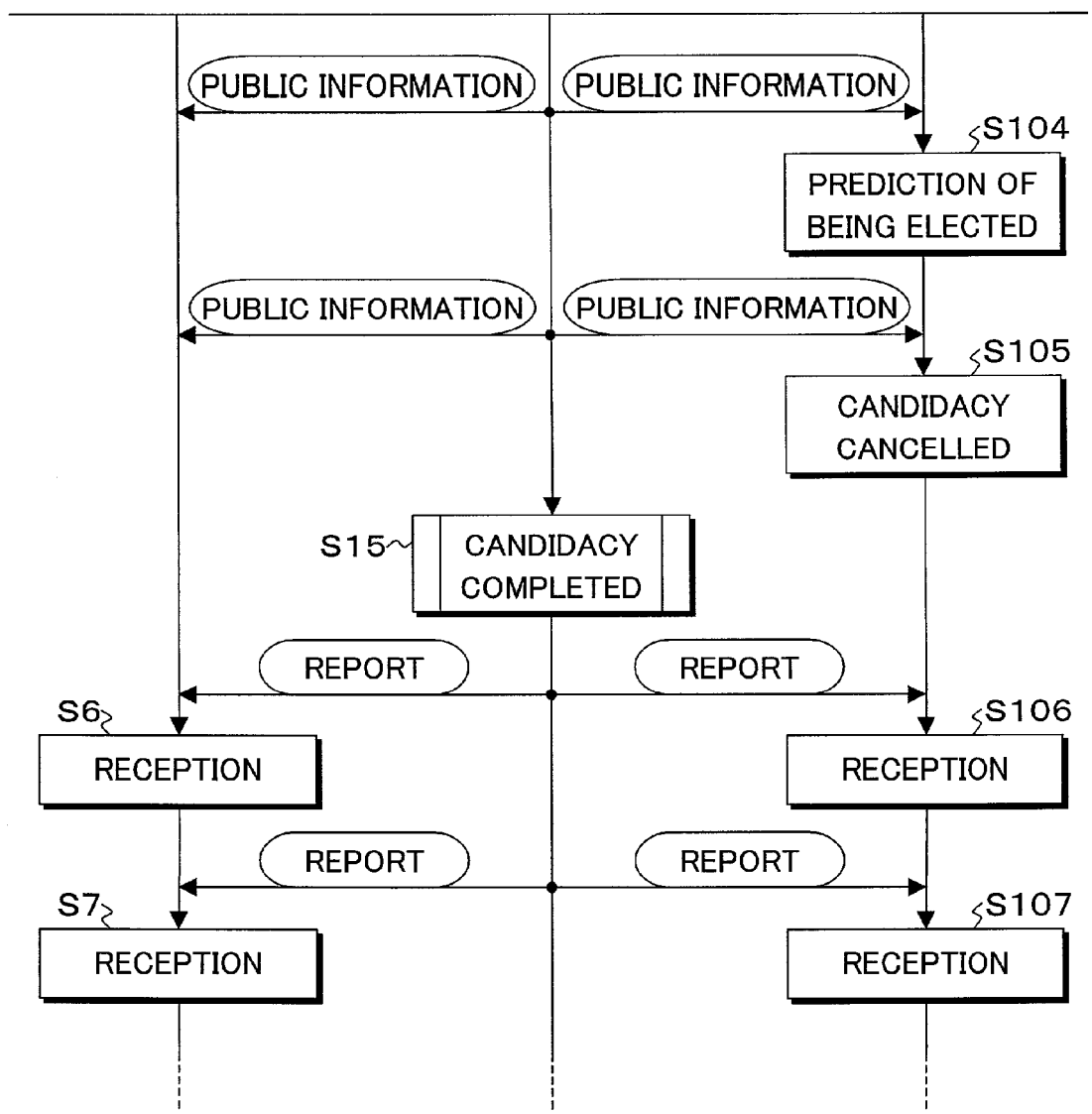

FIG. 8A and FIG. 8B are time charts of the server candidacy processing in the system boot time and, for example, as shown in FIG. 2A AND FIG. 2, enumerates an example of the case wherein the main server candidate node group 28 includes the servers 10-1 to 10-4 and the server candidacy processing was performed to decide the main server by the three nodes 10-1 to 10-3 from among them.

First, assume that two nodes 10-1, 10-2 are allowed to boot at the same time of steps S1, S11. Subsequent to boot this, in steps S2, S12, the reception processing starts, respectively. This reception processing is a processing where the report in the case of the main server already being decided is received and the reception period is renewed and, if there is the report from the other node, the candidacy is given up since the main server has been decided. In this case, since the object three nodes 10-1 to 10-3 are not in operation, the report information after the main node decision from other nodes is not received in steps S2, S12 and, therefore, the nodes 10-1, 10-2 perform the candidacy processing of steps S3, S13, respectively after the reception period is completed. This candidacy processing is a processing in which the candidate transmits its public relations information to other nodes. In this case, by the candidacy of the node 10-1 in step S3, its public relations information is presented to the nodes 10-2, 10-3. At this time, the node 10-2 runs as the candidate in step S13 and, in this state, in order to receive the public relations information from the node 10-1 by its candidacy, respective election probabilities are obtained in step S14 on the basis of the public relations information of the candidate and the public relations information received from the node 10-1. This step S14 is the case where the election probability of the node 10-2 is larger than the election probability of the node 10-1 and, therefore, the candidacy thereof is not withdrawn. Subsequent to the election prediction of step S14, the node 10-2 transmits its public relations information to other nodes 10-1, 10-3. On the other hand, the public relations information which the node 10-1 transmitted in step S3 on the basis of its candidacy is received also in the node 10-3, but, at this time, the node 10-3 performs the reception processing in step S102 and since it is a candidate of step S103, it does not perform the election prediction on the basis of the public relations information from the node 10-1. Since the node 10-2 has high election probability by the election prediction of step S104, without withdrawing its candidacy, subsequent to the election prediction of step S14, it transmits its public relations information to other nodes 10-1, 10-3, respectively. At this time, since the node 10-1 has already filed its candidacy in step S3, it receives the public relations information from the node 10-2 and performs the election prediction in step S4. Assume that, in the election prediction of step S4, the election probability of the node 10-1 is smaller than the election probability of the node 10-2. In this case, the node 10-1 cancels its candidacy in step S5 and stops the transmission of its public relations information to other nodes and afterwards. In contrast to this, the node 10-2 which did not withdraw its candidacy in the election prediction of step S14 repeatedly transmits its public relations information to other nodes 10-1, 10-3 on a constant cycle. On the other hand, the node 10-3, which has been most late to boot, runs for the candidate in step S103 and transmits its public relations information to other nodes on the basis of its candidacy. Further, when the node 10-3 receives the public relations information from the node 10-2 which does not withdraw its candidacy at present, it performs the election prediction in step S104. As a result of the election prediction of step S104, when the election probability of the node 10-3 is smaller than the election probability of the node 10-2, the node 10-3 withdraws its candidacy in step S5 and stops the transmission of its public relations information to other nodes and afterwards. After that, in the node 10-2, when the election period is completed by the election timer started by the candidacy of step S13, the candidacy is completed in step S15. With this timing, the node 10-1 has already cancelled its candidacy in step S5 and the node 10-3 has also already cancelled its candidacy in step S105 and, therefore, the node 10-2 alone which did not withdraw its candidacy remains as the candidacy and, thereby, the node 10-2 is decided as the main server at a point of time when the election period is completed. When the node 10-2 is decided to be the main server by the completion of the candidacy of step S15, the node 10-2 repeatedly transmits the report information to assert the right of its being the main server to other nodes 10-1, 10-3 on a constant cycle. In contrast to this, the nodes 10-1, 10-3 perform the reception processing by the reception timer. During the reception period in this reception processing, when the report information to assert the right of the main server is received from the node 10-2 which became the main server, the reception timer is re-triggered (renewed) and a new reception period starts. For this reason, if the node 10-2 which was decided to be the main server stops due to interruption and the like, the report information to assert the right of the main server cannot be received during the reception period by the reception timer and, therefore, the stop of the main server has to be recognized and, at this point of time, the candidacy to newly decide the main server has to be filed.

Figure 9:
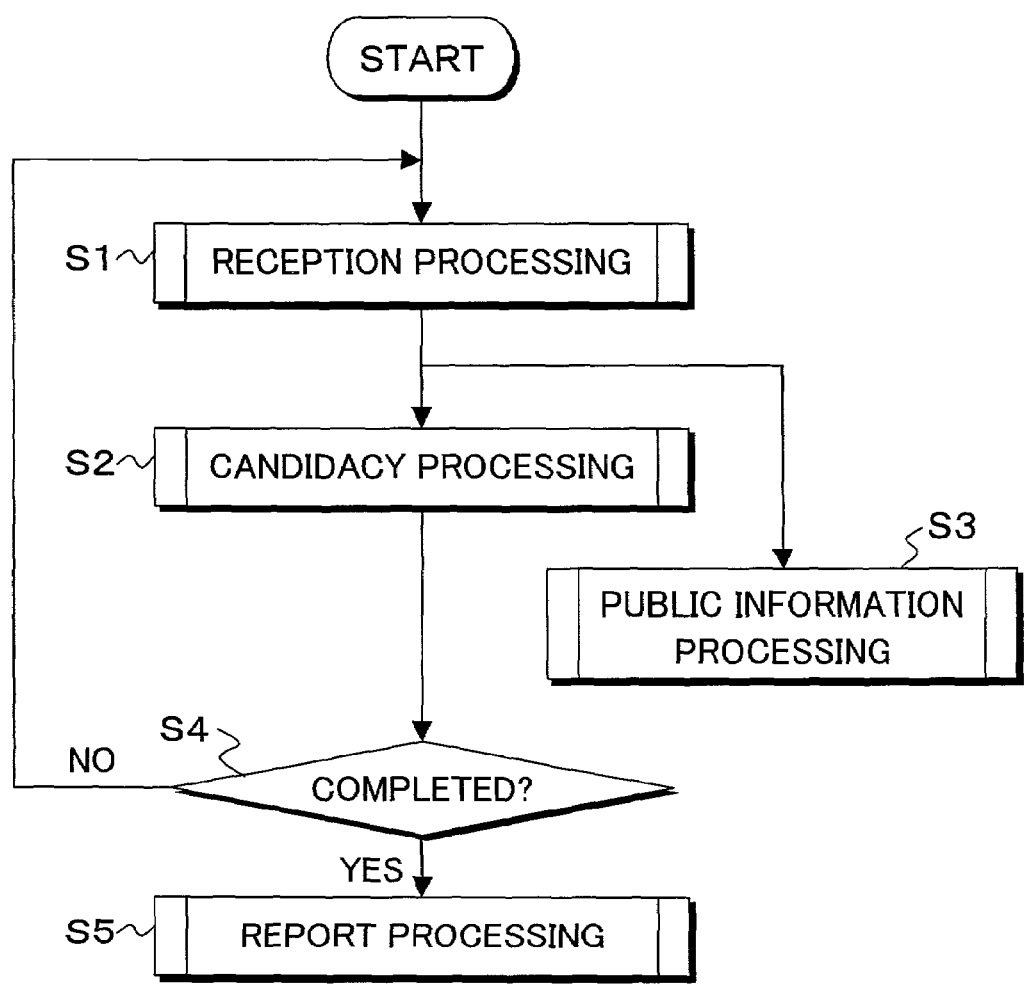
FIG. 9 is a total flowchart by the server candidacy processing unit.

FIG. 9 is a flowchart of the entire processing of the server decision processing according to the present invention.

First, the reception processing is performed in step S1 and, when the main server is not yet decided, the report information to assert the right of the main server is not received so that the reception processing is completed, and the candidacy processing of step S2 and the public information processing of step S3 are performed in parallel. Regarding the candidacy processing of step S2, when the completion of the candidacy is determined in step S4, the report processing after the main server decision is performed in step S5.

Figure 10:
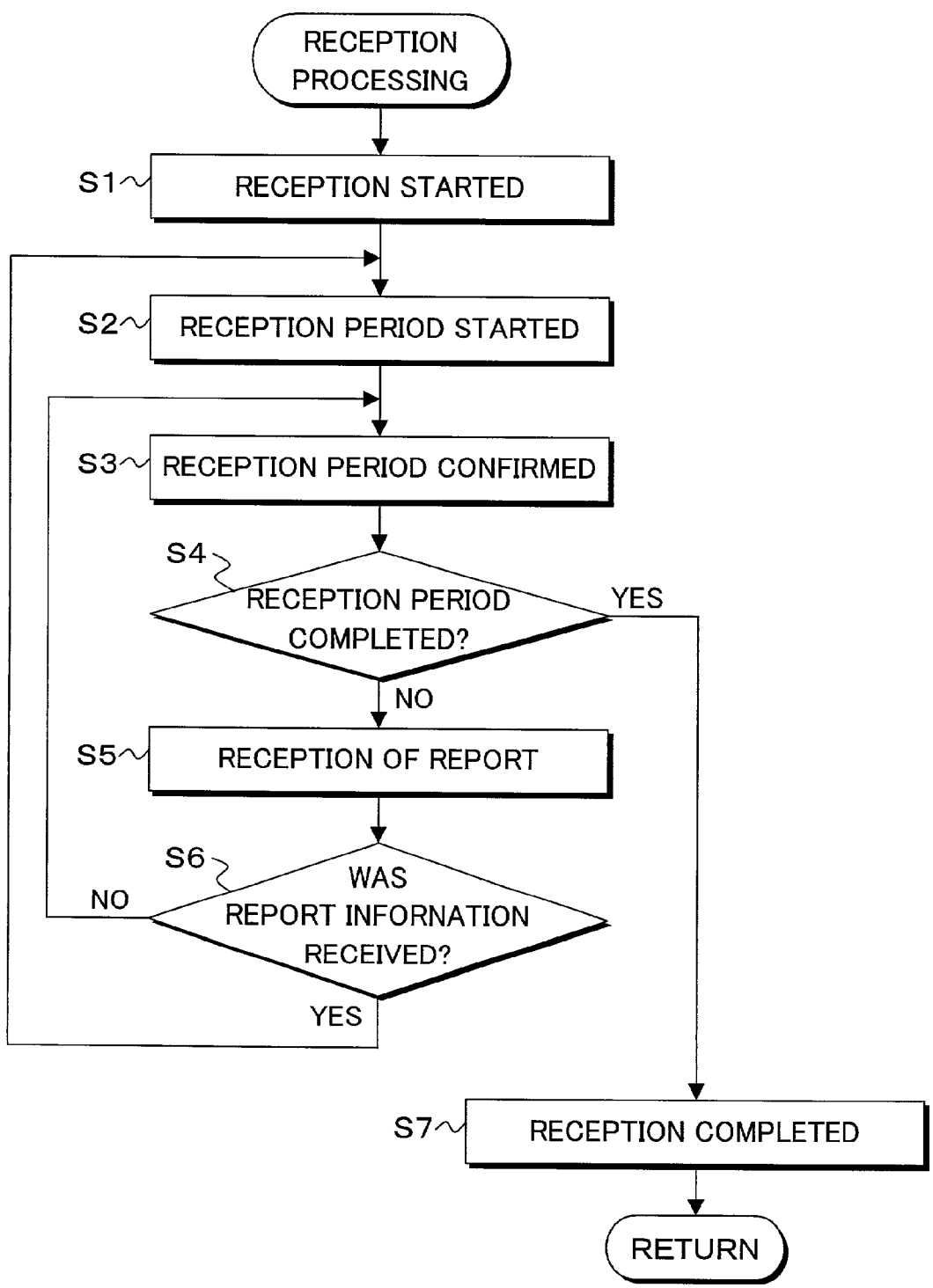
FIG. 10 is a detailed flowchart of the reception processing of FIG. 9.

FIG. 10 is a flowchart showing the details of the reception processing of step S1 of FIG. 9. First, when the reception starts in step S1, the counting of the reception period starts by the start of the reception timer in step S2. Next, in step S3, the reception period is confirmed and, in step S4, when the reception period is not completed, the reception of the report information to assert the right of the main server from other nodes is performed in step S5 and, in step S6, if the report information is received, the process returns to step S2 and re-starts the reception timer so as to newly begin the counting of a new reception period. In contrast to this, if the report information was not received in step S6, the reception period is confirmed in step S3 and, in this case, without restarting the reception timer, checking as to whether or not the reception period of step S4 is completed and receiving confirmation of the report reception of step S5 are repeated. In step S4, during the reception period, if there was received no report to assert the right of the main server, it is determined that there exists no main server in the system and the reception is completed in step S7 and the process advances to the candidacy processing of step S2 and the public information processing of step S3.

Here, the reception processing after the rising in the nodes 10-1 to 10-3 of the time chart moves to the next public information processing and the candidacy processing only after the reception period is completed since there is received no report information to assert the right of the main server in this state. In contrast to this, during the operation after the main server was decided, when the report information is not received, but the reception period is completed, it is the case where the nodes which decided the main server failed and, in this case, the candidacy processing and the public information processing have to be performed again. Further, the reception processing of FIG. 10 is basically performed by the nodes, which are not decided to be the main server, while the node which was decided to be the main server performs the report reception from other nodes in step S5 and, if there was received the report reception from other nodes in step S6, it shows an abnormal state wherein two main servers exist in the same system and, in this case, the reception of the report information to assert the right of the main server from other nodes is regarded as the candidacy by compulsorily performing the reception completion of step S7 and the process enters the candidacy processing of step S2 and the public information processing of step S3 of FIG. 9.

Figure 11:
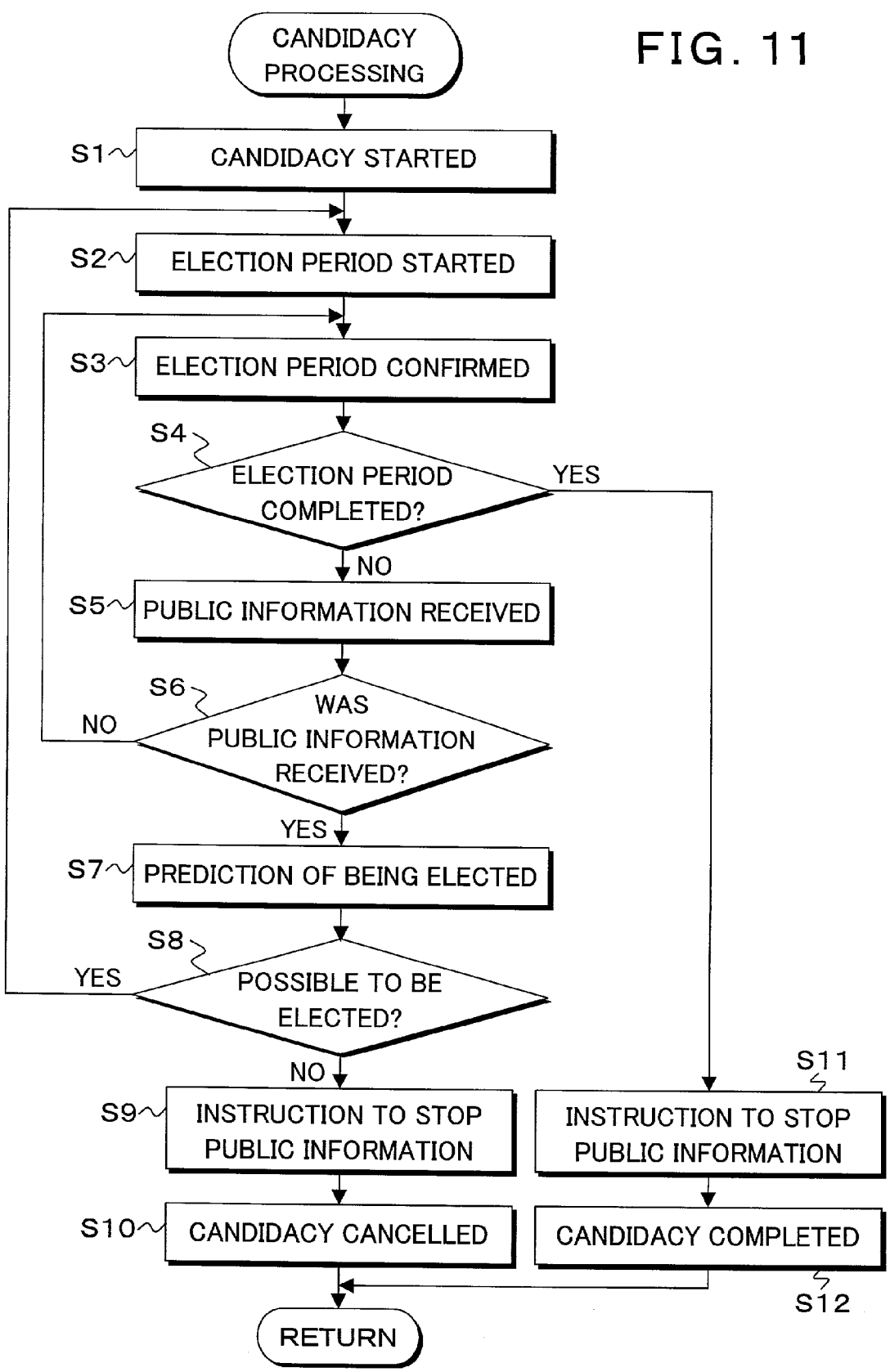
FIG. 11 is a detailed flowchart of a public relations information processing of FIG. 9.

FIG. 11 is a flow chart of the details of the candidacy processing 12 of FIG. 9. First, in step S1, the candidacy starts on the basis of the reception completion and, in step S2, the election timer is activated and the election period starts. Subsequently, in step S3, the election period is confirmed and, in step S4, checking is made as to whether or not the election period is completed. When it is still during the election period, in step S5, the reception processing of the public information from other nodes is allotted and, in step S6, when there is received the report information from other nodes, the election prediction is performed in step S7. As a result of the election prediction of step S7, when the election is possible, the process returns to step S2 and a new election period starts, that is, the election timer is re-activated so that a new election period is allowed to start. In contrast to this, as a result of the election prediction in step S8, when the election was not possible, the public information stop instruction is issued in step S9 and, after that, the candidacy is cancelled in step S10. To be specific, the server flag is turned OFF from ON at the time of the candidacy and the candidacy is cancelled. On the other hand, during the election period, when there was received no public relations information from the other nodes or when the public relations information was received and the election prediction was performed, but the election period was completed in a state of the election prediction being possible, the process advances from step S4 to step S11 and, after the public information stop instruction is issued, completes the candidacy in step S12. In this case, the server flag is maintained in a state of being ON which was turned ON by the candidacy and, as a result, the candidate is in a state of being decided to be the main server.

Figure 12:
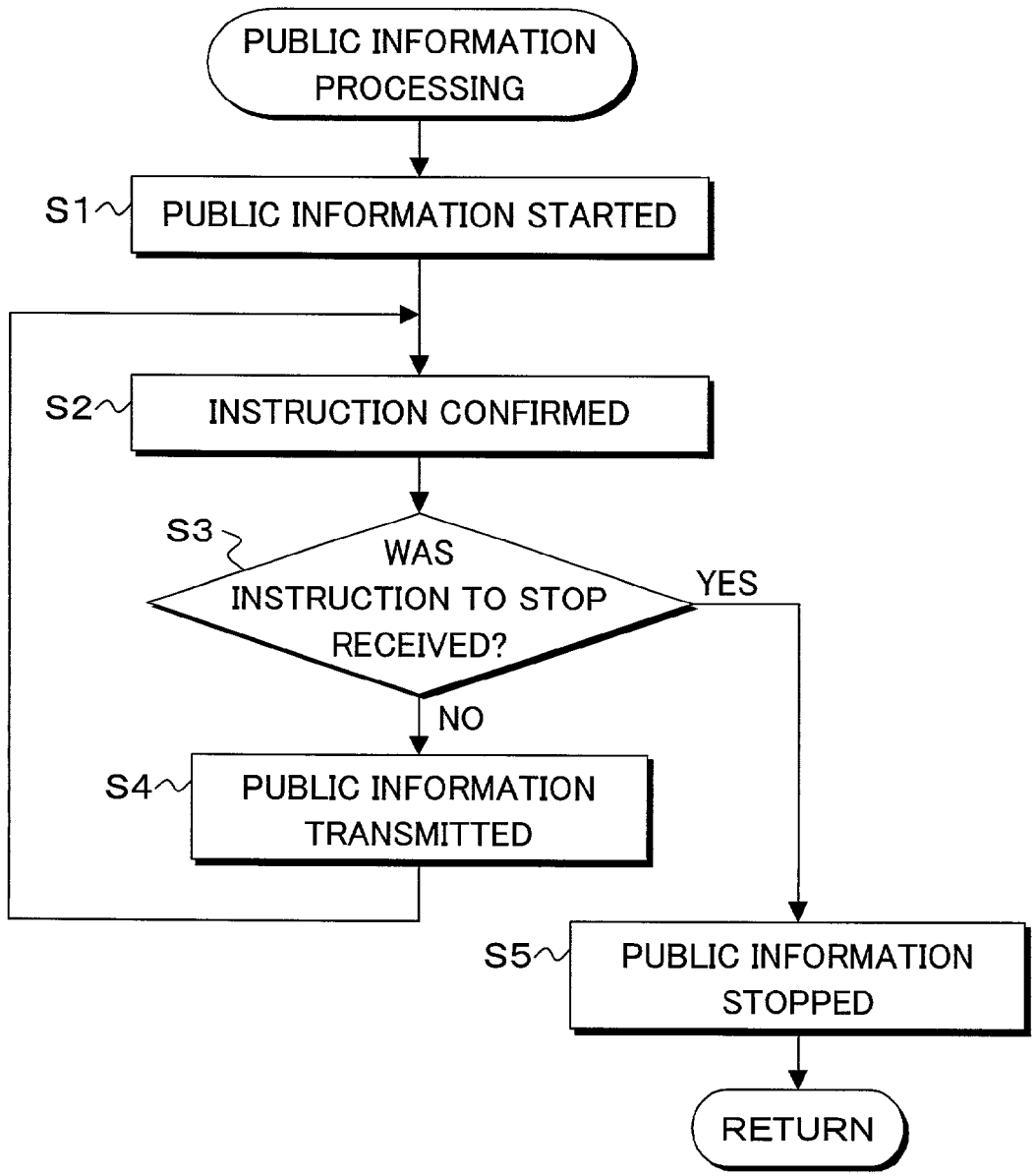
FIG. 12 is a detailed flowchart of a candidacy processing of FIG. 9.

FIG. 12 is details of the public information processing of step S3 of FIG. 9. When the public information processing starts in step S1 followed by the completion of the reception period, the stop instruction on the public information processing is confirmed in step S2. When the stop instruction is not issued in step S3, the public information is transmitted to other nodes in step S4. In contrast to this, when the public information stop instruction is issued in step S9 or step S11 in the candidacy processing of FIG. 11, this stop instruction is distinguished in step S3 and the process advances to step S5 and stops the public information. By such a public information processing, when the candidacy is not withdrawn in step S10 in the candidacy processing of FIG. 11, there is issued no public information stop instruction and, therefore, the transmission of the public relations information to other nodes is periodically repeated by repetition of the processing of steps S2, S3, S4. In contrast to this, when the public relations information stop is performed prior to the cancellation of the candidacy by the candidacy processing of FIG. 11 or the public relations information stop is performed due to completion of the election period, the process advances to step S5 of FIG. 12 so as to stop the public relations information.

Figure 13:
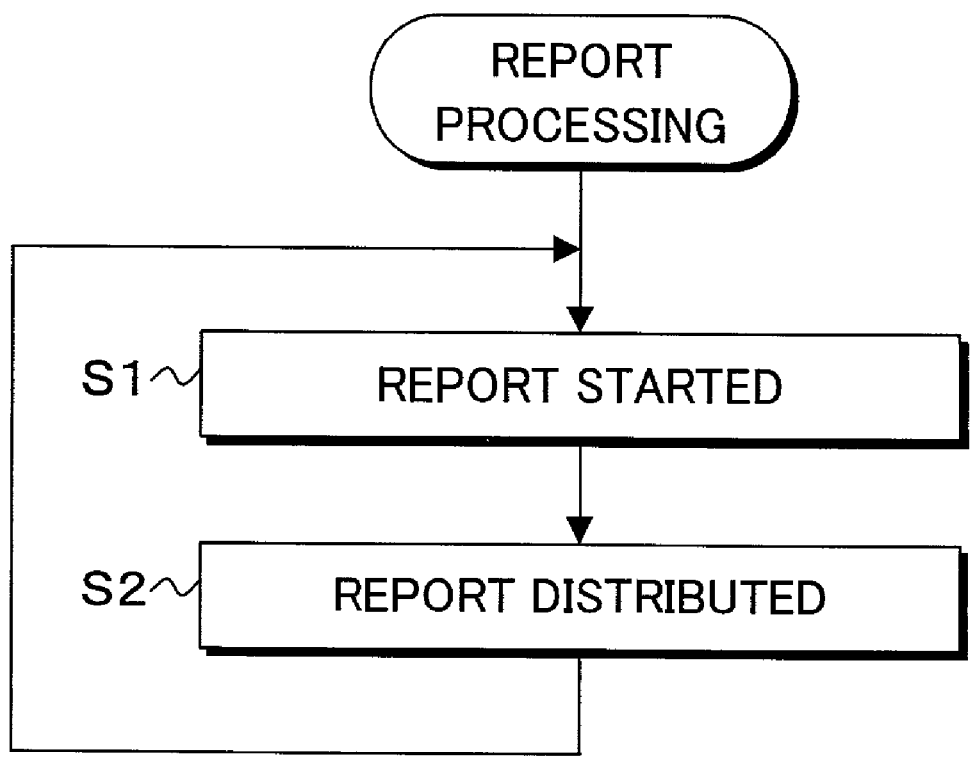
FIG. 13 is a detailed flowchart of a report processing of FIG. 9.

FIG. 13 is a detailed flowchart of the report information of step S5 of FIG. 9. In the report processing, when the candidate is decided to be the main server by the candidacy processing in step S4, the report starts and, in step S2, the candidate distributes the report information to assert the right of being the main server to other nodes and periodically repeats the processing of step S1, S2. This report processing is performed only from the node which was decided to be the main server and, when the server decided to be the main node stops due to interruption and the like, a periodical report distribution is stopped so that other nodes recognize the stopping of the main server, thereby necessitating to perform the candidacy processing to decide the main node among a plurality of remaining nodes.

Further, while the above described server decision processing takes the processing among the nodes which belong to the main server candidate node group 28 as an example, the entirely same processing to decide the sub-server is also performed on the nodes which belong to the sub-server candidate node group 30. For this reason, in the cluster system, the main server and the sub-server are decided at the boot time and, even when the abnormality such as the stopping of two nodes of the main server and the sub-server during the operation develops, as far as there exist the nodes in the main server candidate node group 28 and the sub-server candidate node group 30, the optimum nodes as the main server and the sub-server are automatically decided by the candidacy processing and always exist as the main server and the sub-server so that the reliability of the management task of setting and operating of the cluster system by the Web browser can be largely improved.

Further, while the above described embodiment takes the case where the nodes are classified into the main server candidate node group and the sub-server candidate node group and the main server and the sub-server are decided from among them as an example, the processing to decide the server which allots the specific task, for example, the cluster management task with one node group as an object can be performed in the entirely same manner.

Further, while the above described embodiment takes the case where the main server and the sub-server are decided for the cluster management server of the cluster system as an example, the task of deciding the main server and the sub server is not limited to the cluster management task, but even for a suitable task as occasion demands, for example, a user application, the main server and the sub-server may be dynamically decided by the candidacy processing in the similar manner.

Further, while the above described embodiment obtains the election probability of each server as the election prediction to decide the main server or the sub-server from the nodes which run for the candidates and compares them, the optimum node may be decided by comparison processing by the presentation of the information which can select the optimum node among the nodes out of the election probability which run for the candidates. For example, by mutually exchanging the information so as to be able to select the optimum node among the nodes which run for the candidate such as the list of resources which can be allotted to the required task and a degree of inconvenience in the case where the task which is presently required is allotted, whether or not the candidacy is withdrawn may be determined.

Further, the present invention is not limited to the above described embodiments, but includes the modifications which do not harm the object and advantages of the present invention. Further, the present invention is not subject to the limit by the numerical values shown in the above described embodiments.

INDUSTRIAL APPLICABILITY

As described above, according to the present invention, when the system is constituted, the nodes are classified into the main server candidate node group and the sub-server candidate node group so that, by the candidacy among the candidate nodes, the nodes most suitable for a specific task, for example, the management task are automatically decided as the main server and the sub-server and, further, even when the nodes which were decided as the main server and/or the sub-server stopped during the operation, the optimum nodes among the nodes which remained are decided as the main server and/or the sub-server, and a serious situation is reliably avoided, wherein the nodes which decided the main server and the sub-server stopped and became incapacitated to perform the entire task of the system, and the reliability of the management task, for example, such as setting, operating in the cluster system can be improved and the availability as the system can be largely improved.

What is claimed is:

1. A server decision method which decides the existence of an only server to operate a specific task within a plurality of servers connected via a network, the method comprising:
classifying a plurality of servers into a main server candidate group capable of operating the specific task, a sub-server candidate group capable of operating a back-up operation of the specific task, and an out-of-candidate server group that is excluded from operating the specific task and the back-up operation,
wherein each server in said main server candidate group presents public relations information necessary for an election judgment of a main server to all other servers and runs for a candidate at a boot time and, at the same time, compares said main server public relations information to that of other servers and, when it is determined that a particular server is not a desirable candidate, presentation of said particular server's public relations information is stopped and its candidacy is withdrawn,
wherein each server in said sub-server candidate group presents public relations information necessary for an election judgment of a sub-server to other servers and runs for a candidate at a boot time and, at the same time, compares said sub-server public relations information to that of other servers and, when it is determined that a particular sub-server is not a desirable candidate, presentation of said particular sub-server's public relations information is stopped and its candidacy is withdrawn, and
wherein, after said boot time, a main server or a sub-server periodically reports an operation of the specific task to other servers and asserts a right of said main server or sub-server and, when a same report is received from other servers asserting the right of said main server or sub-server, a duplicate-starting of a plurality of main servers or a plurality of sub-servers is recognized, and public relations information from the asserted server or sub-server is presented to all servers and said asserted server or sub-server runs as a candidate and, at the same time, compares its public relations information to that of other servers, and when it is determined that the asserted server or sub-server is not a desirable candidate, presentation of its public relations information is stopped and its candidacy is withdrawn.

2. The server decision method according to claim 1, wherein said main server or sub-server periodically reports the operation of the specific task to other servers and asserts the right of said main server or sub-server and, when a same report is received from other servers asserting the right of said main server or sub-server, the existence of a plurality of main servers or sub-servers is recognized and public relations information from said asserted server or sub-server is presented to all other servers and the asserted server or sub-server runs as a candidate and, when it is determined that other servers are desirable for said main server or sub-server by comparing said asserted server's public relations information to that from other servers, the specific task is stopped and the right of said asserted main server or sub-server is handed to another server.

3. The server decision method according to claim 1, wherein said main server candidate group either has resources necessary to operate the specific task, or is desired to positively operate the specific task,
wherein said sub-server candidate group either does not have enough resources to operate the specific task, or is desired to passively operate the specific task, and
wherein the out-of candidate server group either does not have enough resources to operate the specific task, or is not desired to operate the specific task.

4. The server decision method according to claim 1, wherein said public relations information is a duty cycle of resources, and an allowance rate of distributable resources is obtained from a requirement volume of the specific task and said public relations information as an election probability and, when an election probability of a particular server candidate is smaller than an election probability of other server candidates, presentation of said particular server candidate's public relations information is stopped and its candidacy is withdrawn.

5. The server decision method according to claim 4, wherein said allowance rate is obtained for each type of said distributable resources and a smallest allowable rate is used for said election probability.

6. The server decision method according to claim 1, wherein a specific task of said main server is a management task to perform setting and monitoring of each server and a specific task of said sub-server is to back up said management task of the main server.

7. A server decision device which decides the existence of an only server to operate a specific task within a plurality of servers connected via a network, comprising:
a classifying unit for classifying each of said plurality of servers into a main server candidate group capable of operating the specific task, a sub-server candidate group capable of operating a back-up task of the specific task, and an out-of-candidate server group which is excluded from operating the specific task and the back-up task;

a main server processing unit to which each of the servers in said main server candidate group presents public relations information necessary for the election judgment of a main server, each of said servers running as a candidate at a boot time and, at the same time, each of said servers compares its respective public relation information to that of other servers and, when it is determined that a particular server is not a desirable candidate, presentation of said particular server's public relations information is stopped and its candidacy is withdrawn; and a sub-server processing unit to which each of the servers in said sub-server candidate node group presents public relations information necessary for the election judgment of a sub-server to all the servers, each of said sub-server servers running as a candidate at a boot time and, at the same time, each of said sub-server servers compares its respective public relations information to that of other servers and, when it is determined that a particular sub-server server is not a desirable candidate, presentation of said particular sub-server server's public relations information is stopped and its candidacy is withdrawn, wherein a main server candidacy processing unit of said main server and a sub-server candidacy processing unit of said sub-server are selected at said boot time and periodically report an operation of the specific task to all other servers and assert a right of said main server or said sub-server at an operation starting time after boot and, when a same report asserting said right of said main server or said sub-server is received from other servers, said candidacy processing units recognize a duplicate starting of a plurality of said main servers or said sub-servers and present public relations information of said asserted main server or sub-server to all other servers and, at the same time, compare said main server or sub-server public relations information to that of other servers and, when a particular main server or sub-server is determined to not be desirable candidate, presentation of said particular main server or sub-server's public relations information is stopped and its candidacy is withdrawn.

8. The server decision device according to claim 7, wherein, during operation of the device, said main server candidacy processing unit or said sub-server candidacy processing unit periodically reports an operation of the specific task to other servers and asserts said right of said main server or sub-server and, when a same report asserting said right of said main server or sub-server is received from other servers, the existence of a plurality of main servers or a plurality of sub-servers is recognized, and public relations information from said asserted main server or sub-server is presented to all of the servers and said asserted main server or sub-server runs as a candidate and, at the same time, when it is determined that another server is a desirable candidate by comparing said asserted main server's or sub-server's public relations information to that of said another server, the specific task is stopped and said asserted right of said main server or said sub-server is handed over to said another server.

9. The server decision device according to claim 7, wherein said main server candidate group either has necessary resources to operate the specific task, or is desired to positively operate the specific task, wherein said sub-server candidate group either has necessary resources to operate the specific task, or is desired to passively operate the specific task, and wherein said out-of-candidate server group either has not the necessary resources to operate the specific task, or is not desired to operate the specific task.

10. The server decision device according to claim 7, wherein said public relations information is a duty cycle and said main server candidacy processing unit or sub-server candidacy processing unit obtains an allowance rate of distributable resources from a requirement volume of the specific task and said duty cycle of said public relations information as an election probability and, when an election probability of one server candidate is smaller than an election probability of another server candidate, presentation of said one server candidate's public relations information is stopped and its candidacy is withdrawn.

11. The server decision device according to claim 10, wherein said main server candidacy processing unit or sub-server candidacy processing unit obtains said allowance rate for each type of said distributable resources and a smallest allowable rate for said election probability.

12. The server decision device according to claim 7, wherein a specific task of said main server is a management task to perform setting and monitoring of each server in a cluster system, and a specific task of said sub-server is to back up said management task.

* * * * *